Figure 1:
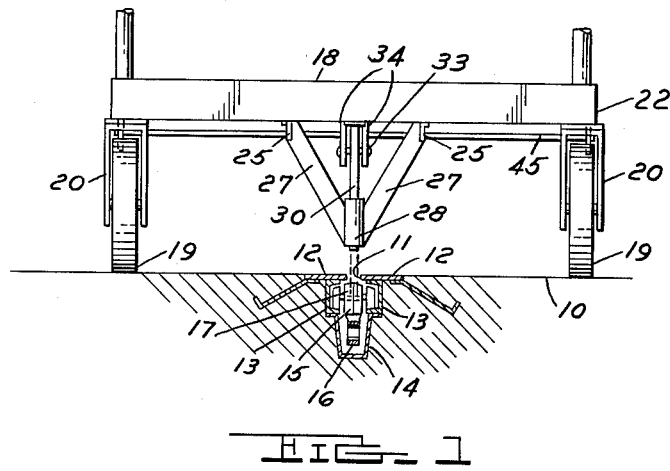

March 13, 1956  H. A. FOLSOM  2,737,902
FLOOR TRUCK DRIVE PIN

Filed Sept. 11, 1953  2 Sheets-Sheet 1

INVENTOR.
HAROLD A. FOLSOM
BY
Farley Forster & Farley

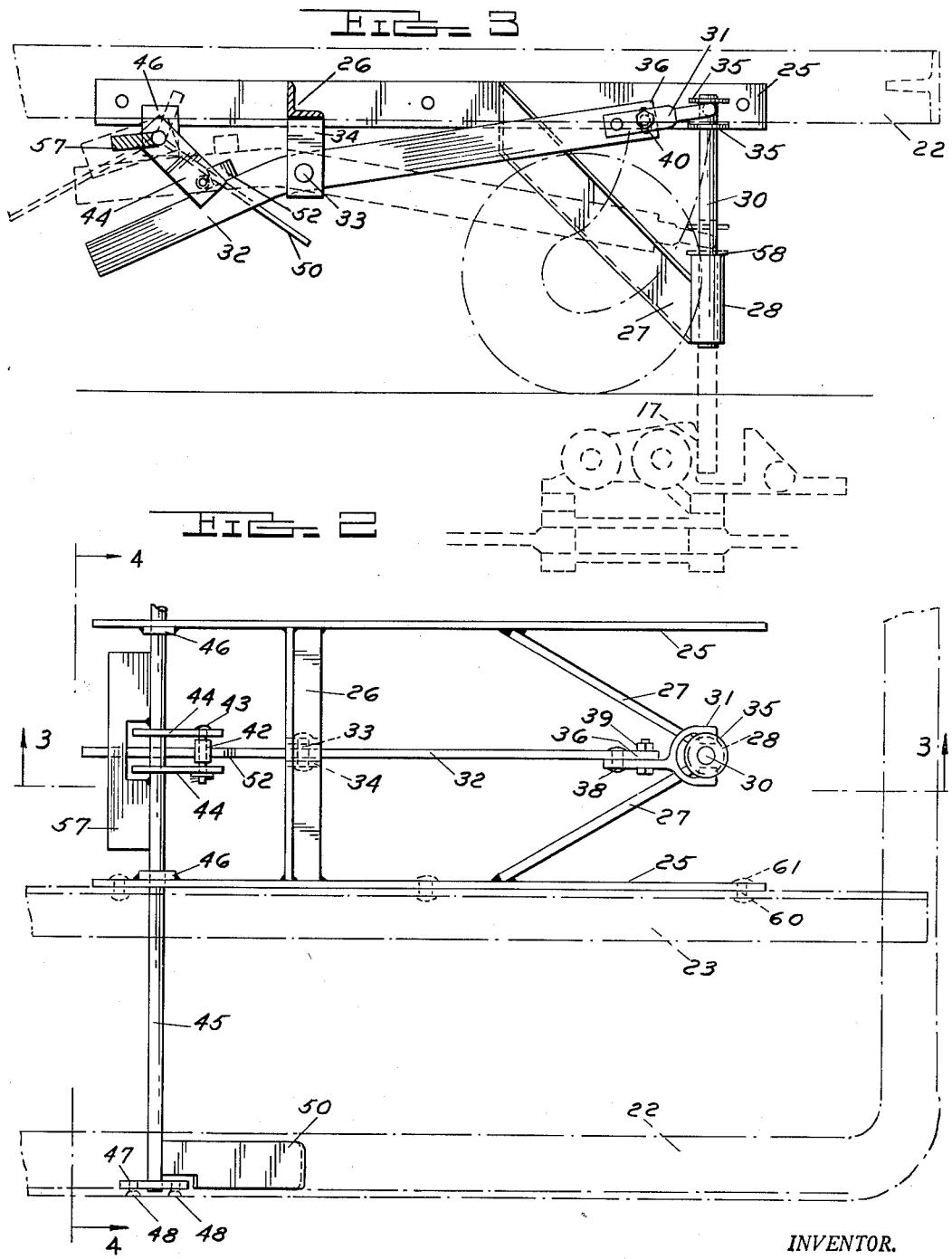

United States Patent Office 2,737,902
Patented Mar. 13, 1956

2,737,902

FLOOR TRUCK DRIVE PIN

Harold A. Folsom, Detroit, Mich., assignor to Jervis B. Webb Company, Detroit, Mich., a corporation of Michigan Application September 11, 1953, Serial No. 379,646

8 Claims. (Cl. 104—172)

This invention relates to the construction of a drive pin for a floor truck or similar carrier for transporting articles in the material handling field. The drive pin is of the vertically movable type, which, when lowered, is engaged by a drive line moving along a level below that of the surface which supports the carrier.

The drive pin construction of the invention has particular utility when employed on a floor truck carrier of a subfloor drive-line installation such as described in U. S. Patent No. 2,621,610. Consequently, the invention will be described in association with that type of construction which will be briefly summarized as part of the general background of the invention.

Submerged drive-line systems of this type are widely employed in warehouses and on the loading docks of truck and railroad terminals. A drive line, including a number of spaced pusher dogs, is installed below floor level, with the pusher dog traveling in vertical alignment with a guide slot located at floor level. Four-wheel trucks, having caster-type wheels for the front pair, are commonly employed as carriers, and are modified for this work by the installation of a vertically movable drive pin on their front end. The position of this drive pin is manually controlled. When lowered into the guide slot, it will be engaged by one of the pushers of the drive line. When locked in raised position, its lower end will clear the surface of the floor so that the truck may be propelled wherever desired, even across the path of the drive line, since the guide slot is relatively narrow and offers no obstruction to movement of the trucks.

Mounting the drive pin on the front end of a truck is advantageous from a standpoint of simplicity of construction, but it has proved to have many operational disadvantages. For example, if a truck collides with some object, the drive pin is the part most likely to be damaged. The front end location is fairly remote from the supporting wheels so that any relative movement vertically between the truck and the pusher member of the drive line is amplified at the position of the drive pin. This is very important in any installation where there is a change of floor level along the drive line. The results of a truck becoming disengaged from a pusher member on an incline, or in the path of a following truck can be quite hazardous.

The front end location of the drive pin requires that an operator move at least a portion of his body into the path of travel of the truck in the operation of lowering a pin into the guide slot for engagement by the drive line, or disengaging the pin therefrom.

According to the present invention the drive pin is mounted beneath the load supporting bed of the truck at a location within the sides and ends thereof for vertical movement between raised and lowered positions. This movement is controlled by an actuating handle, operable from a position alongside of the truck and outside of its path of travel, and by suitable actuating means so that the drive pin can be engaged with and disengaged from the drive line by movement of the handle.

Preferably, the drive pin actuating means includes a lever engaging the drive pin and pivotally mounted in an unbalanced condition so that the weight of the lever augments the weight of the drive pin to move the drive pin downwardly to its lowered position. Upward movement of the lever and drive pin is produced by a crank mounted on a shaft with the actuating handle. The raised position of the pin is defined by a stop which the crank engages after it has passed a dead center position in the direction of upward movement, so that in effect, the weight of the drive pin and lever act to maintain the crank in contact with the stop and thus retain the parts in raised position.

Proper positioning of the parts is further provided for by counterbalancing the moment of the actuating handle and crank so that this moment alone cannot produce a movement of the drive pin from its raised or lowered positions.

Preferably, also, the entire construction is mounted on a frame structure which is separate from but attachable to the structure of the truck. This frame is adapted to be mounted underneath the bed of the truck and includes suitable longitudinal and transverse members which support a drive pin mounting sleeve in a position intermediate the truck wheels.

This drive pin mounting permits free rotation of the pin about its own axis in order to minimize the wear from the pin contacting either side of the guide slot, and the mechanism for raising and lowering the pin does not interefere with its rotatability in any position. All the mechanism is located within the bounds of the truck's frame, so that there are no dangerous projections and so that all parts are relatively safe from damage by collision. The mechanism leaves the front end of the truck entirely unobstructed so that trucks can, if desired, easily be equipped with some form of hitch or coupler for movement in train, either on or off the drive line.

Certain other advantages of the invention will be brought out in connection with the description to be given of the construction and operation of a presently preferred embodiment. This construction illustrates the invention and is shown in the accompanying drawings which comprise the following views:

Fig. 1, an elevation of the front end of a floor truck of conventional design, equipped with the drive pin construction of the invention. This view includes a cross-sectional showing of one form of drive-line construction with which the truck may be used.

Fig. 2, a plan view of the drive-pin construction on an enlarged scale. In this view the outline of the main frame members of the truck are shown in phantom, and only slightly more than half of the construction is shown in a direction transverse of the truck, the construction being symmetrical about the longitudinal center line of the truck.

Fig. 3, a side elevation of the construction shown in Fig. 2, taken along the line 3—3 of Fig. 2. Included in this view is a phantom showing of a pusher dog of the drive line engaging the drive pin in lowered position.

Figure 4:
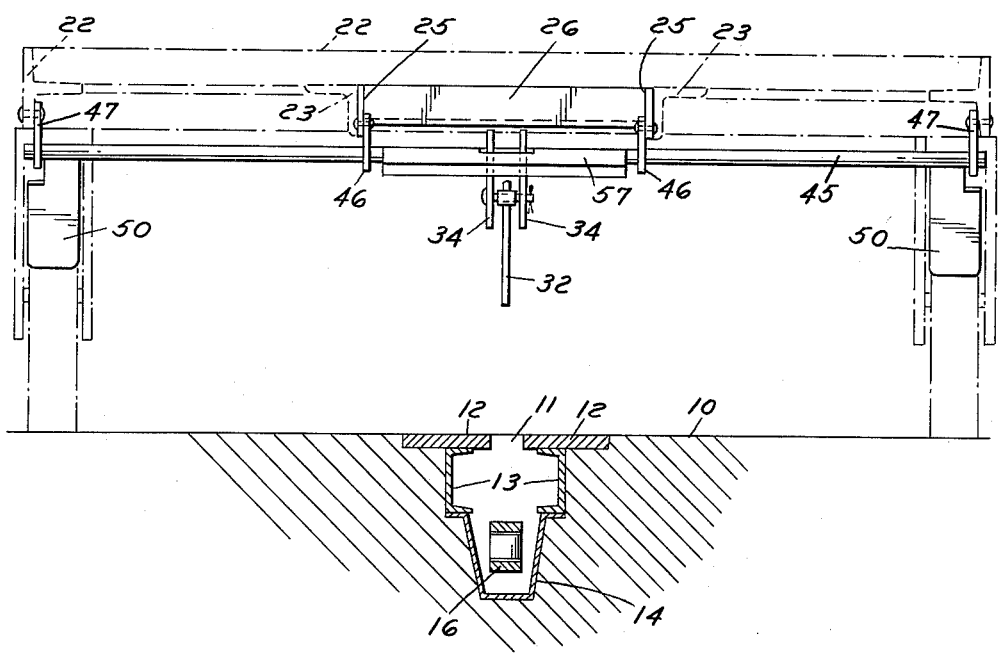

Fig. 4, an enlarged transverse elevation of the construction taken along the line 4—4 of Fig. 2. The drive pin has been eliminated from this view for the sake of clarity.

Referring to Fig. 1, which is a view looking at the front end of a truck, a drive-line construction is shown located beneath the level of the supporting floor surface 10. This drive line consists of a guide slot 11 defined by a pair of spaced plates 12, each located with their upper surface flush with floor level. A trolley trackway is formed by a pair of opposed channel members 13 positioned beneath and at either side of the guide slot, and the structure is completed by a chain trough 14 located beneath and between the track members 13. A trolley 15 travels along the trackway and is connected to and driven by a chain 16. The trolley includes a pusher member or dog 17 (see Fig. 3).

A truck of the type conventionally employed as a carrier in connection with this drive line includes a bed or supporting surface 18 and a pair of front wheels 19, each individually supported by a caster type bracket 20 pivotally connected to the truck frame on a vertical axis.

The frame of the truck is composed of T-section side and end members 22, and a pair of longitudinally extending angle members 23 having their upper surfaces at the level of the web of the T-section 22 to support the members forming the bed 18 of the truck, which is usually made of wood.

The specific drive-pin mechanism disclosed has been designed to fit a floor truck having the above constructional features so that the drive-pin construction may be added to an existing truck as a unit assembly.

The drive-pin assembly is built around its own framework (Fig. 2), made up of a pair of longitudinal members 25, which are connected by a cross angle member 26 and which are indirectly connected through a pair of struts 27 which extend downwardly and inwardly from each of the longitudinal frame members 25 and are connected to and through a sleeve 28.

A drive pin 30 is slidably and rotatably supported in the sleeve 28, and is movable between the raised position shown in full line in Fig. 3, and the lowered position indicated in dotted line in that view by an actuating mechanism carried by the framework just described. This actuating mechanism includes a lever 32, pivotally secured at 33 between a pair of straps 34, which are mounted on and extend downwardly from the cross member 26. Lever 32 extends midway between the frame side members 25 and carries a yoke 31 at its forward end, which loosely straddles the drive pin 30 between a pair of vertically spaced washers 35 secured thereto. The yoke is adjustably mounted on the forward end 36 of the lever 32 by a pin 38 and a bolt 39 which engages a slot 40 (Fig. 3).

The lever 32 is actuated by a roller 42 mounted on a pin 43 carried between a pair of crank arms 44 which are attached to a cross shaft 45. The cross shaft 45 is mounted between a pair of bearing blocks 46 secured to each of the frame members 25, and in another pair of bearing blocks 47 which are secured to the side rails 22 of the truck by screws 48.

An actuating pedal 50 is attached to the cross shaft 45 at a point adjacent each of its ends, so that an actuating pedal lies beneath each side rail of the truck.

Raised position of the drive pin is defined by a stop 52 secured to the upper face of the actuating lever 32 at a position where the roller 42 of cranks 44 has passed its dead-center position for upward movement of the drive pin. Means are preferably included for normally urging the cranks 44 towards a position of engagement with the stop 52, and in the construction shown this means comprises a counterweight 57 secured to the cross shaft 45.

Thus the assembly can be seen to consist of a relatively few number of simple parts which can easily be assembled and which will give a long period of normally trouble-free operation. This assembly can be easily connected to an existing type of truck. The longitudinal frame members 25 of the assembly are spaced so as to be insertable between the longitudinal angle members 23 of the truck frame, to which they are connected by drilling holes 60 and employing suitable fasteners such as the rivets 61 shown. Holes must also be drilled in the side frame members 22 for mounting the outer bearing supports 47 of the cross shaft 45.

Once the assembly has been mounted on the truck, the drive pin 30 can be lowered by exerting a downward force on the operating pedal 50 to rotate the crank 44 clockwise as the parts are viewed in Fig. 3 and move the roller 42 of the crank past its dead-center position. Once past this position, the weight of the drive pin 30 and forward end of the actuating lever 32 will cause downward movement of the drive pin to continue until limited by the engagement between the lower of the pair of washers 35 and the upper surface 58 of the sleeve 28. This weight of the parts always acts, with the construction shown, to urge the drive pin 30 downwardly, and it should be noted that the counterweight 57 is placed on the shaft 45 so that when the pin 30 is in lowered position, the counterweight is acting to hold the pedal 50 in the dotted-line position shown in Fig. 3, and tends to maintain the roller 42 out of contact with the actuating lever 32 so that no upward movement of the drive pin will result from the weight of the pedal and crank.

Any contact between the drive pin 30 on a moving truck and either side of the guide slot will result in the drive pin revolving in the sleeve 28. Such contacts are frequent, particularly as a truck is traversing a curved section in the drive line, and hence the rotational mounting of the drive pin reduces wear appreciably. The loose yoke type connection between the drive pin and actuating lever further contributes to the reduction of wear, as it allows free rotation of the pin during raising or lowering movement in case of contact between the pin and guide slot at that time.

The construction results in a placement of the pin rearwardly from the extreme front of the truck and centrally between the front wheels thereof, to give a better line for draft forces between the pusher dog of the drive line and the truck, and at the same time minimize vertical relative movement caused by changes in floor level, or the wheels of the truck passing over obstructions. Actually, optimum results in these respects would be obtained were the pin on the center line of the front axle of the truck, but in the present construction this optimum has been compromised in the interest of obtaining better visibility of the pin so that its condition and position can be more readily determined by visual inspection.

Raising of the pin is, of course, accomplished by movement of the operating pedal 50 in the opposite direction from the dotted line to the full line position shown in Fig. 3. Either raising or lowering movement of the pedal can be foot or hand actuated by an operator standing at either side of the path of travel of the truck so that there is less likelihood of an accident to his person.

If train operation of trucks is desired, as is frequently employed in terminals where tractors are used to propel a number of trucks to and from a loading zone, suitable couplings can easily be attached to the front and rear of the truck without in any way interfering with the positioning of the drive pin or its operation.

The foregoing description is illustrative only of the subject matter defined by the following claims.

I claim:

1. A drive pin construction for use with a floor truck having a load supporting bed for connecting the truck in driven relationship with a subfloor drive line, comprising a drive pin, means mounting the drive pin beneath the bed of the truck at a location within the side and end edges thereof, said mounting means including a sleeve member fixedly carried by the truck structure and slidably supporting said drive pin for vertical movement between raised and lowered positions, an actuating handle operable from a position alongside of the truck and outside of its path of travel, and drive pin actuating means interposed between said handle and said pin whereby the latter can be engaged with and disengaged from said drive line by movement of the handle.

2. A drive pin construction according to claim 1 wherein the drive pin actuating means comprises a lever having one end engaging said drive pin, means pivotally connecting said lever to said truck in unbalanced relation whereby the weight of the lever normally urges the drive pin to lowered position, a transversely extending shaft carried beneath the truck bed and mounting a crank, said crank engaging said lever to produce upward movement of the drive pin in response to rotary movement of said shaft, and at least one actuating handle secured to said shaft.

3. A drive pin construction according to claim 2 further characterised by said actuating means including a stop contactable by said crank after said crank passes a dead center position in the direction of upward movement of said lever and drive pin, said crank being maintained in engagement with said stop by the weight of said lever and drive pin.

4. A drive pin construction according to claim 2 wherein said shaft is provided with counterweight means counteracting the the moment of said actuating handle and crank to prevent movement of said lever and drive pin due to such moment when the drive pin is in its raised and lowered positions.

5. A drive pin construction according to claim 1 wherein the drive pin, drive pin mounting means, actuating handle and actuating means are mounted on a frame separate from, but attachable to the underside of the truck structure.

6. A drive pin construction according to claim 5 wherein said frame includes longitudinal and transverse members supporting said drive pin mounting sleeve at a position intermediate the wheels of the truck, and below the bed of the truck.

7. A drive pin construction according to claim 1 wherein the actuating handle is located beneath the bed of the truck and within the side edge thereof.

8. A drive pin construction according to claim 1 wherein the drive pin is mounted for free rotary movement about its own axis and relative to said drive pin mounting means and actuating means.

References Cited in the file of this patent

UNITED STATES PATENTS

| | | |
|---|---|---|
| 1,000,106 | Morris | Aug. 8, 1911 |
| 1,124,271 | Bernheim | Jan. 12, 1915 |
| 2,619,370 | Leger | Nov. 25, 1952 |